US012604051B2

(12) United States Patent
Boscardin et al.

(10) Patent No.: US 12,604,051 B2
(45) Date of Patent: Apr. 14, 2026

(54) METHODS AND SYSTEMS FOR GENERATING A MULTIPLE USER PROFILE

(71) Applicant: DISH Network L.L.C., Englewood, CO (US)

(72) Inventors: Levi Boscardin, Denver, CO (US); Erik Nava, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 96 days.

(21) Appl. No.: 18/472,630

(22) Filed: Sep. 22, 2023

(65) Prior Publication Data

US 2025/0106453 A1    Mar. 27, 2025

(51) Int. Cl.
*H04N 21/25*      (2011.01)
*H04N 21/466*     (2011.01)
(52) U.S. Cl.
CPC ....... *H04N 21/252* (2013.01); *H04N 21/4668* (2013.01)

(58) Field of Classification Search
CPC ......................... H04N 21/252; H04N 21/4668
See application file for complete search history.

(56) References Cited

U.S. PATENT DOCUMENTS

| | | | |
|---|---|---|---|
| 9,734,531 B2 * | 8/2017 | Wouhaybi .......... | G06Q 30/0631 |
| 11,070,860 B2 * | 7/2021 | Francisco ........ | H04N 21/25875 |
| 11,907,312 B1 * | 2/2024 | Li ........................ | H04L 67/535 |
| 2015/0039549 A1 * | 2/2015 | Aufmann ........... | G06Q 30/0631 |
| | | | 706/46 |
| 2016/0080810 A1 * | 3/2016 | Dutta ................. | H04N 21/2187 |
| | | | 725/38 |

* cited by examiner

*Primary Examiner* — Joshua D Taylor
(74) *Attorney, Agent, or Firm* — Perkins Coie LLP

(57) ABSTRACT

The present disclosure is directed to methods and systems generating a multiple user profile. The profile system can create a multiple user profile based on metadata associate with two or more user profiles. The multiple user profile can include media content for the users to consume together based on shared attributes between the individual profiles of the users. The profile system can determine profiles that have similar attributes and send a recommendation for the users to join a group profile.

20 Claims, 10 Drawing Sheets

INPUT PROCESSING SYSTEM

MEMORY
205

PROCESSOR(S)
210

MACHINE LEARNING MODULE
215

GROUP PROFILE MODULE
220

RECOMMENDATION MODULE
225

COMMUNICATIONS MODULE
230

200

Profile B

Attributes D, E, and F

Profile A

Attributes A, B, and C

Profile AB
(Multiple User Profile of Profile A and B)

Attributes A, B, C, D, E, and F

420

480

Recommendation that everyone will enjoy content with attribute C

Profile A
Attributes A, B, and C

Profile B
Attributes C, D, and E

Profile C
Attributes A, C, and F

Profile D
Attributes A, C, and D

METHODS AND SYSTEMS FOR GENERATING A MULTIPLE USER PROFILE

BACKGROUND

User profiles are common among streaming platforms for tailoring products and recommendations to users. The user profile can include a user's viewing history, content preferences, and ratings applied to different content. However, systems only generate recommendations for a single profile based on the usage data of the user.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for generating a multiple user profile. The profile system can create a multiple user profile based on metadata associated with two or more user profiles. For example, profile A and profile B are associated with user A and user B in a household who watch media content together. The profile system can generate a multiple user profile (e.g., a shared profile, group profile, family profile, couple profile, etc.) that identifies media content for user A and User B to watch together based on metadata associated with both profile A and profile B.

The profile system can provide recommendations of media content to a user based on metadata from the multiple user profile that the user participates in. In some implementations, the profile system can determine media content that multiple users would enjoy based on the individual profiles of the users and/or multiple user profiles of the users. The profile system can identify and recommend that users watch media content together based on individual profiles of the users. Users can communicate with other users and the profile system via a user interface. For example, users can receive recommendations from the profile system via the user interface. The profile system can perform operations locally on a user device or via cloud-based device(s) that can provide/support generating multiple user profiles and recommendations.

Figure 1:
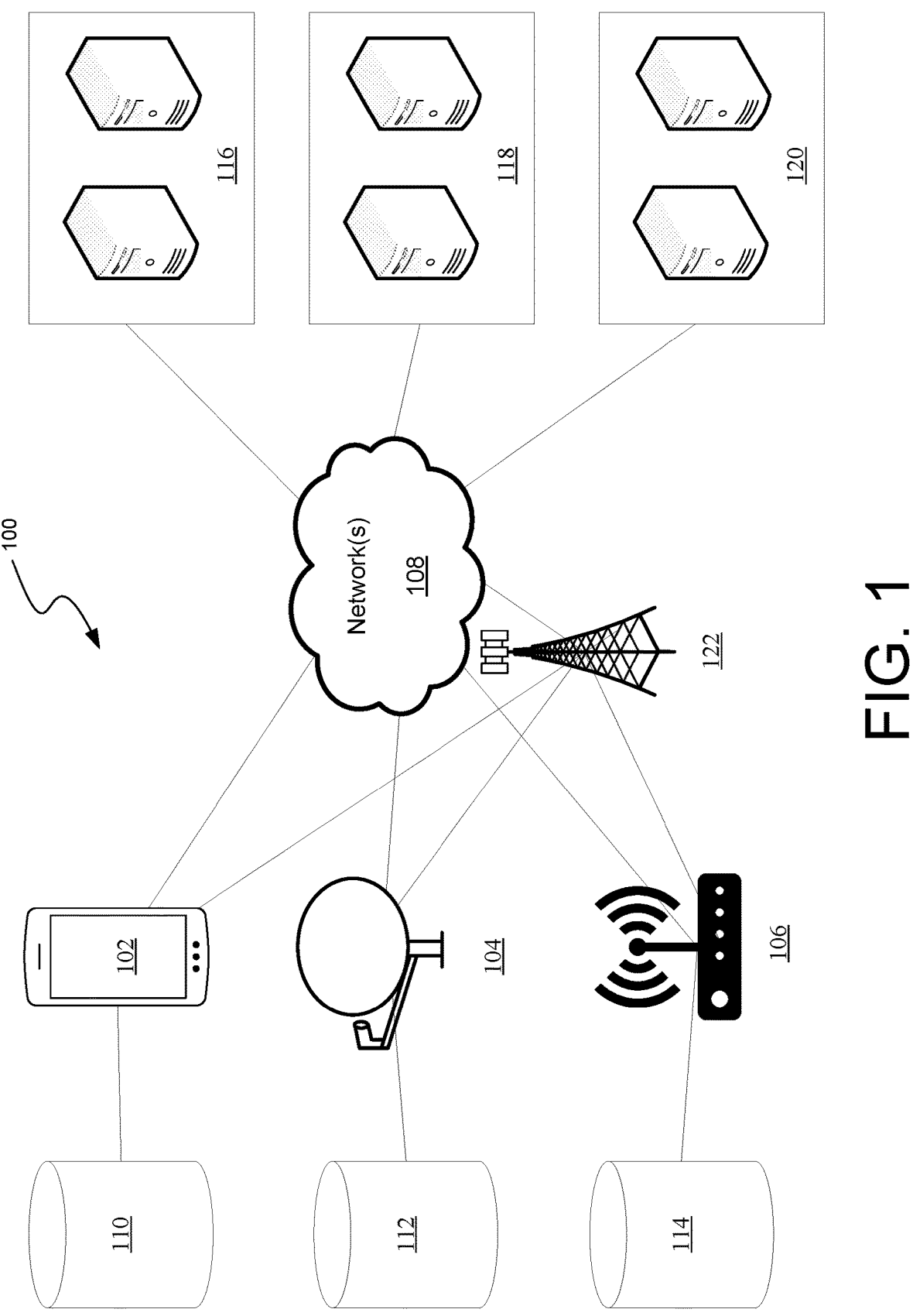
FIG. 1 illustrates an example of a distributed system for generating a multiple user profile.

FIG. 1 illustrates an example of a distributed system for generating a multiple user profile. Example system 100 presented is a combination of interdependent components that interact to form an integrated whole for generating a multiple user profile and providing media content recommendations to users. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to support multiple user profiles. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, or satellite networks. Other possible client devices include but are not limited to tablets, personal computers, televisions, etc. In aspects, a client device, such as client devices 102, 104, and 106, may have access to one or more networks from a gateway. In other aspects, client devices 102, 104, and 106, may be equipped to receive data from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that identifies metadata of user profiles, determines profiles that have similar attributes, sends recommendation for user to join a group, generates a multiple user profile for the group, and provides media content recommendations. Client devices 102, 104, and 106 may access content data through the networks. The content data may be stored locally on the client device or run remotely via network(s) 108. For example, a client device may receive a signal from broadcast tower 122 containing content data. The signal may indicate user requested media content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing content to a user from a gateway with multiple networks. Such databases may contain certain content data (e.g., metadata) such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
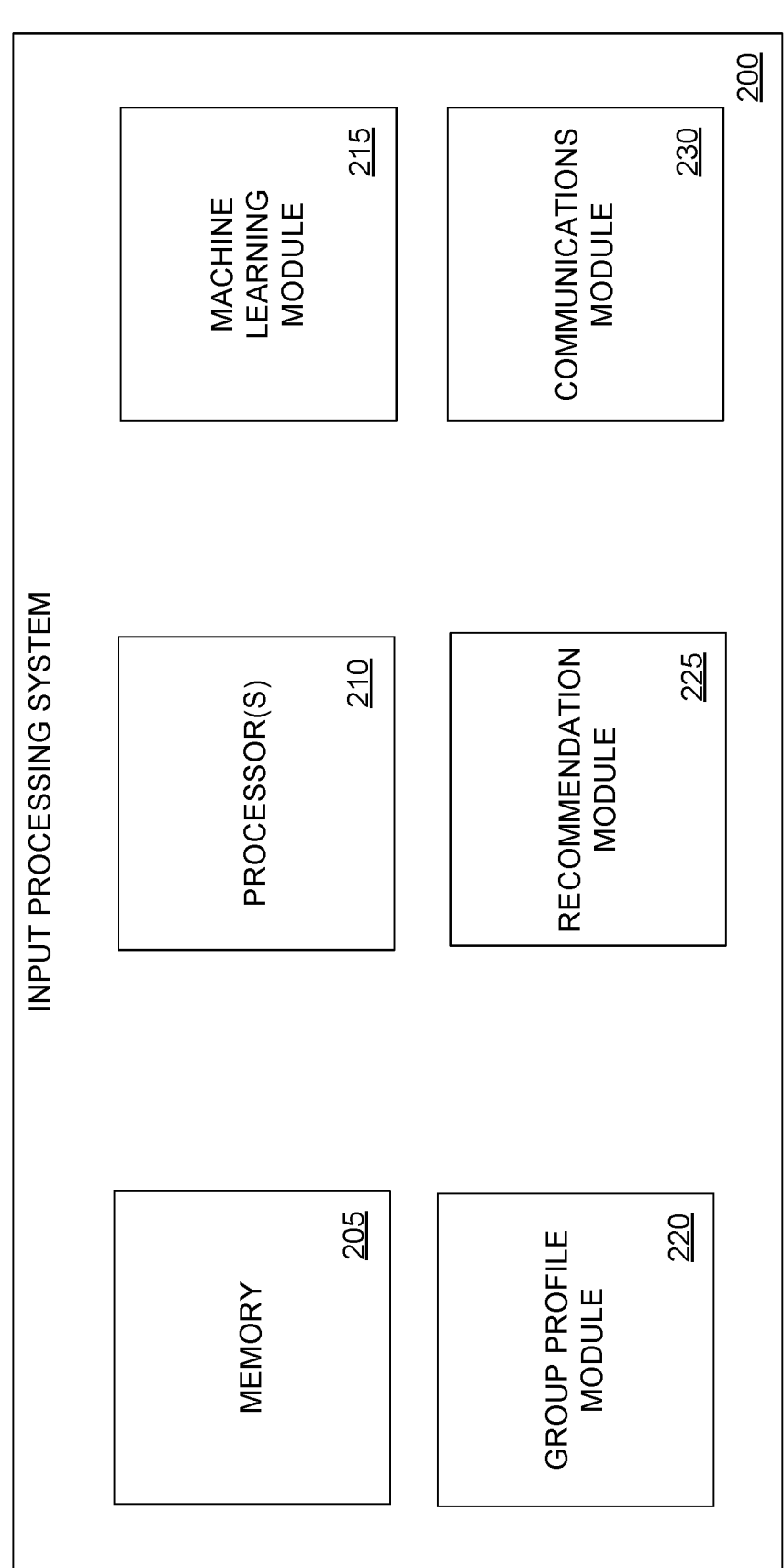
FIG. 2 illustrates an example input processing system for implementing systems and methods for generating multiple user profiles and recommendations.

FIG. 2 illustrates an example input processing system for implementing systems and methods for generating multiple user profiles and recommendations. The input processing system 200 (e.g., one or more data processors) is capable of executing algorithms, software routines, and/or instructions based on processing data provided by a variety of sources related to identifying metadata of user profiles, determining user profiles that have similar attributes, sending recommendation for users to join a group, generating a multiple user profile for the group, and providing media content recommendations. The input processing system can be a general-purpose computer or a dedicated, special-purpose computer. According to the embodiments shown in FIG. 2, the disclosed system can include memory 205, one or more processors 210, machine learning module 215, group profile module 220, recommendation module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of machine learning module 215, group profile module 220, recommendation module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMS, EEPROMS, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the customizable features of the networks, a prioritized order of the networks, or user requested content information, such as audio or video data.

Machine learning module 215 may be configured to analyze metadata (e.g., media content attributes, such as actors, genre, content themes, story lines etc.) of user profile to determine profiles to group together to form a multiple user profile. The machine learning module 215 may be configured to generate a multiple user profile based on at least one machine-learning algorithm trained on at least one dataset reflecting a user selected multiple user profile. The at least one machine-learning algorithms (and models) may be stored locally at databases and/or externally at databases (e.g., cloud databases and/or cloud servers). Client devices may be equipped to access these machine learning algorithms and intelligently identify profile data, such as the media content preferences, and determine profiles to group together based on at least one machine-learning model that is trained on a historical multiple user profiles. For example, if a several users have a history of watching similar media content, the user's profile data may be collected to train a machine-learning model to automatically generate a group profile for the users.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user profiles and other data stores of user data (e.g., social media accounts, user profile settings, user preferences, viewing history, etc.) to identify other profiles to group together. Determining a multiple user profile for a group of users may comprise identifying various attributes of each user profile and selecting profiles with related attributes (e.g., viewing history and preferences). Based on an aggregation of data from a user's viewing history, user profile, location, device settings, and other user data stores, at least one ML model may be trained and subsequently deployed to automatically select user profiles to group into a multiple user profile. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with multimedia information and channel guides. In such examples, the ML model may be locally cached by the client device.

Group profile module 220 is configured to analyze metadata of user profiles to identify profiles that have similar attributes. The metadata can include media content information/attributes, such as genres, actors, directors, artists, titles, story lines, subject matter, content rankings, duration of consuming media content, year of release, year the media content is set in (e.g., 1600 s, 1920s, etc.), content themes (e.g., father/son theme, spy theme, redemption theme, etc.), or any category of media content. The group profile module 220 can assign a score to media content that the user consumes. The score can be based on the media content attributes, such as duration the user consumes the content, the frequency that the user consumers the content, feedback of the user, or content rankings by the user. If multiple users have scores for a media content that are within a threshold value (e.g., within a threshold difference of), the group profile module 220 generates a multiple user profile for the users. The group profile module 220 can send a recommendation that the users of the multiple user profile consume types of media content together. For example, if the users share an enthusiasm for spy movies, the multiple user profile includes media content with espionage themes. The group profile module 220 can identify profiles from which to create a group profile based on user attributes. For example, group profile module 220 analyzes three users associated with an account, such as User A, User B, and User C. If User B always watches media content alone, but User A and User C sometimes (e.g., weekly, monthly, etc.) watch media content together, the group profile module 220 can create a group profile AC for User A and User C to consume content together.

Recommendation module 225 is configured to provide a user with recommendations of media content or other users to share a viewing experience with. The recommendation module 225 can select other users to recommend a viewing experience with based on the media content interests of the users. If users have similar scores (e.g., within a threshold difference) for a particular media content, the recommendation module 225 notifies the users to watch the media content together. For example, if user 1 and user 2 both enjoy (e.g., scores of 90 or more out of 100) watching western themed movies/shows, the recommendation module 225 recommends that user 1 and user 2 watch western themed movies/shows together.

Recommendation module 225 can provide content recommendation to users. The recommendation module 225 can recommend content that a group of users would enjoy (e.g., content scores above a threshold) based on the profiles of the individual users in the group. For example, for a family movie night, recommendation module 225 selects a movie based on the profiles of the members of the family. In some implementations, the recommendation module 225 recommends content for individual profiles based on the content that users of a multiple user profile consume.

Communications module 230 is associated with sending/ receiving information (e.g., multiple user profile information from machine learning module 215, group profile module 220, and recommendation module 225) with a remote server or with one or more client devices, streaming devices, routers, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends profile information identified by the group profile module 220 and recommendation information identified by the recommendation module 225. Furthermore, communications module 230 may be configured to communicate content data to a client device and/or OTA box, router, smart OTA antenna, and/or smart TV, etc.

Figure 3:
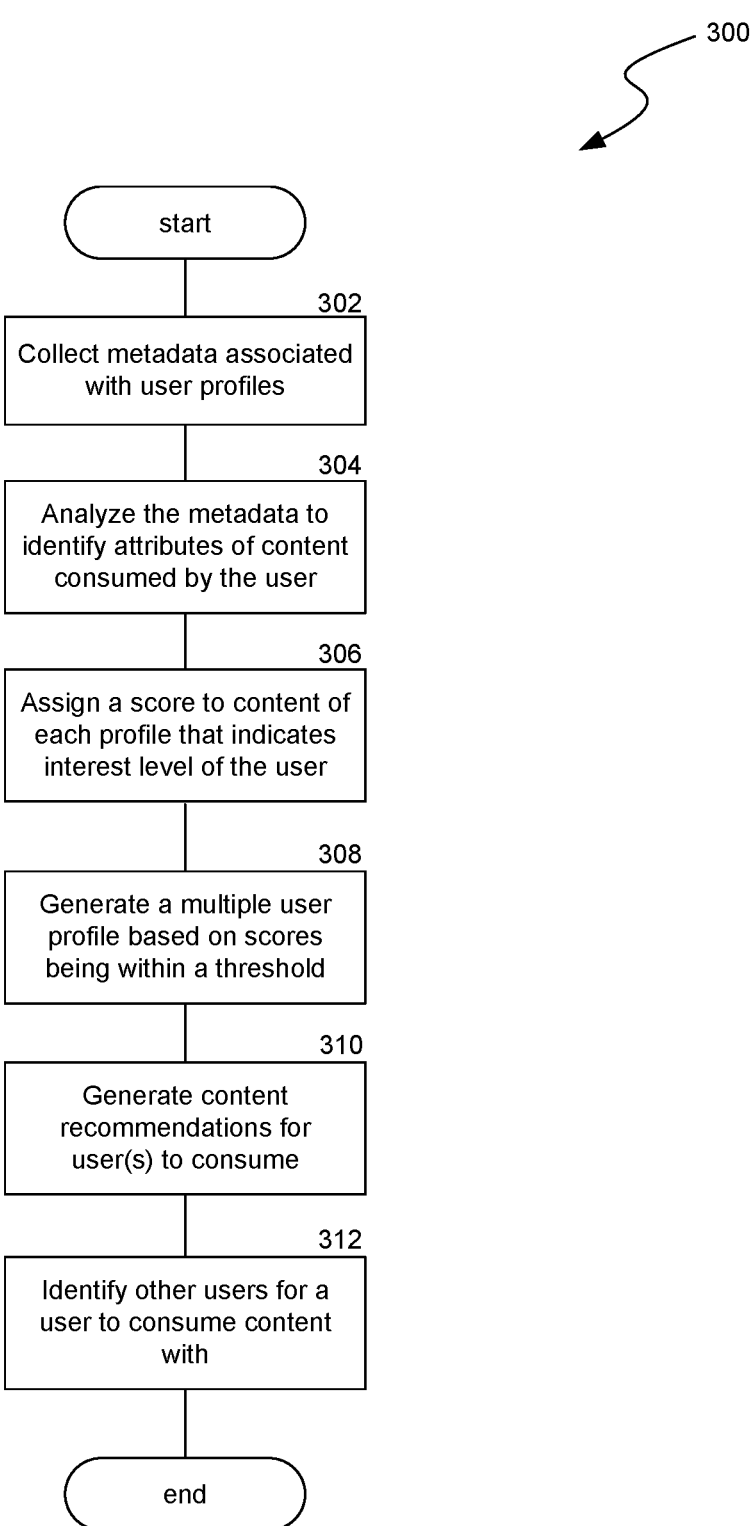
FIG. 3 is a flow diagram illustrating a process used in some implementations for generating a multiple user profile and recommendations.

FIG. 3 is a flow diagram illustrating a process 300 used in some implementations for generating a multiple user profile and recommendations. In some implementations, process 300 is triggered by a user activating a subscription for accessing media content, powering on a device, a device connecting to a gateway (e.g., router), powering on the gateway, the gateway connecting to a source (e.g., ISP, cable network, satellite network, etc.), a user joining a group (e.g., family plan), a user requesting to be added to a multiple user profile, a user requesting recommendations, or the user downloading an application on a device for generating a multiple user profile and recommendation. In various implementations, process 300 is performed locally on the user device or performed by cloud-based device(s) that can provide/support generating multiple user profiles and recommendations.

At block 302, process 300 collects metadata associated with user profiles. The user profiles are selected based on users being members of an organization (e.g., family plan, friend group, subscription package, or any collection of user accounts). The metadata can include media content information/attributes, such as genres, actors, directors, artists, titles, story lines, subject matter, content rankings, duration of consuming media content, year of release, year the media content is set in, content themes (e.g., father/son theme, spy theme, redemption theme, etc.), or any category of media content.

At block 304, process 300 analyzes the metadata to identify attributes of content consumed by the user. The attributes can indicate the type of media content that a user consumes. For example, the attributes indicate that a user enjoys watching specific types of sports, comedy shows, romantic movies, reality television, historical dramas, or any type of media content. The attributes can include the time of day, duration, and frequency that the user consumes each type of media content. For example, a user watches a show on a particular evening of the week when the new episodes are released. In some implementations, the attributes include the user feedback rankings (positive, negative, or indifferent) of the content the user consumes. The frequency that a user consumes content can indicate whether a user enjoys a category of media content or a particular content item. In a first example, if a user regularly watches episodes of a particular show, the system can determine the user enjoys attributes associated with the show. In a second example, if the user watches repeated episodes of a particular show, the system determines that the user enjoys attributes of the show.

At block 306, process 300 assigns a score to media content of each profile. Media content scoring can be based on the attributes that indicate interest by the user in the content. For example, the score is based on the duration that the user consumes the content, the frequency (e.g., daily, weekly, seasonally, etc.) that the user consumers the content, or feedback of the user regarding the content. The score indicates the level of interest that the user has in the media content. For example, if a user watched a single episode of a first show, the first show has a lower score than a second show that the user has watched every episode of every season of the show. Process 300 can generate sub scores for each attribute of content, such as a sub score for types of sports, a sub score for comedy shows, a sub score for romantic movies, a sub score for reality television, a sub score for historical dramas, a sub score for genres, a sub score for actors, a sub score for directors, a sub score for artists, a sub score for titles, a sub score for story lines, a sub score for subject matter, a sub score for content rankings, a sub score for duration of consuming media content, a sub score for year of release, a sub score for year the media content is set in, a sub score for content themes, a sub score for the time of day that the user consumes each type of media content, a sub score for the duration that the user consumes each type of media content, and a sub score for frequency that the user consumes each type of media content. Process 300 can generate an overall score by combining all or some of the sub scores of the attributes.

At block 308, process 300 generates a multiple user profile based on content scores from different profiles being within a threshold. The multiple user profile can include content and content recommendations that users associated with the multiple user profile will enjoy consuming together. For example, the multiple user profile includes content that all the users in the group have a shared interests in. The users of the multiple user profile can receive, via a user interface, a notification to join the multiple user profile. The users can accept or decline to join the multiple user profile.

At block 310, process 300 generates content recommendations for users to consume. Users can send recommendation to other profiles and receive content recommendations from other profiles. In some implementations, the process 300 generates a content recommendation for a group of users. For example, for a family movie night, the profile system can identify a movie recommendation based on the content of interest associated with the profiles of each family member. In some implementations, a user can request the profile system to provide recommendations of content.

At block 312, process 300 identifies other users for a user to consume content with. Process 300 can identify other users who consume similar content to the user and send a recommendation to the user regarding the shared interests in similar content. For example, the profile system can identify family members, neighbors, friends, or any member of the profile system, that have similar content interests. In some implementations, a user can request the profile system to provide recommendations of users to consume content with.

Figure 4A:
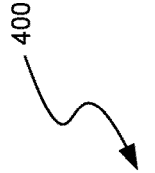
FIG. 4A illustrates a conceptual diagram of generating a multiple user profile.
Figure 4A:
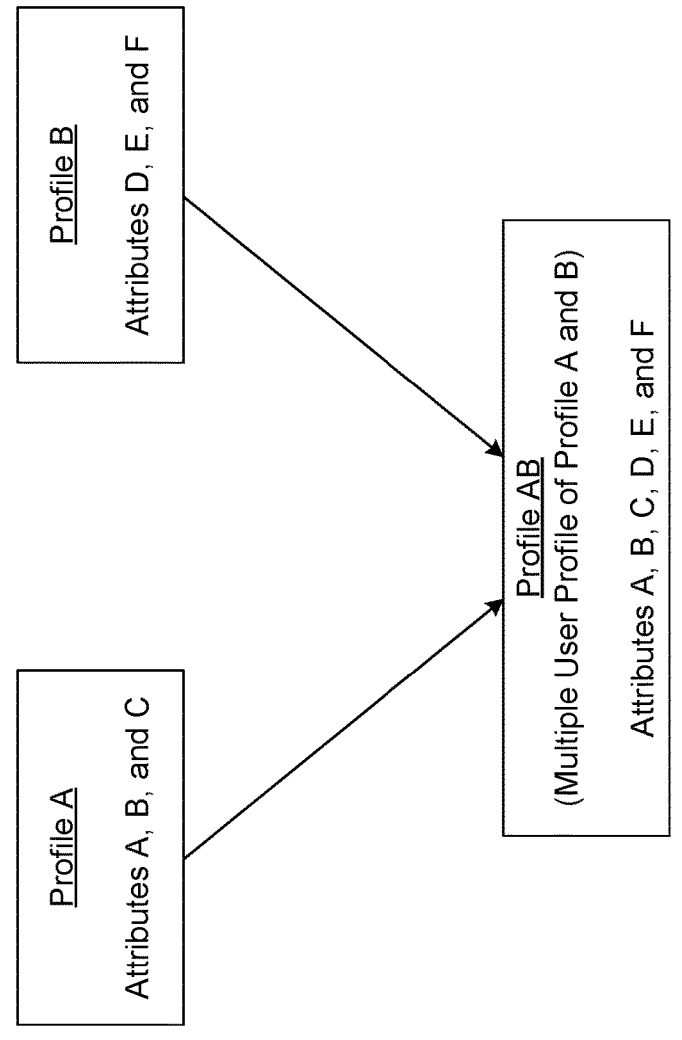

FIG. 4A illustrates a conceptual diagram 400 of generating a multiple user profile. Profile A includes media content attributes A, B, and C. Profile B includes media content attributes D, E, and F. The profile system can generate a profile AB (e.g., a multiple user profile, group profile, family profile, couple profile, etc.) that includes media content attributes A, B, C, D, E, and F. The profile system can identify media content for Profile AB that is of interest to both Profile A and Profile B. For example, when spouses watch a movie on a multiple user profile, the profile system recommends a movie that is of interest to both spouses.

Figure 4B:
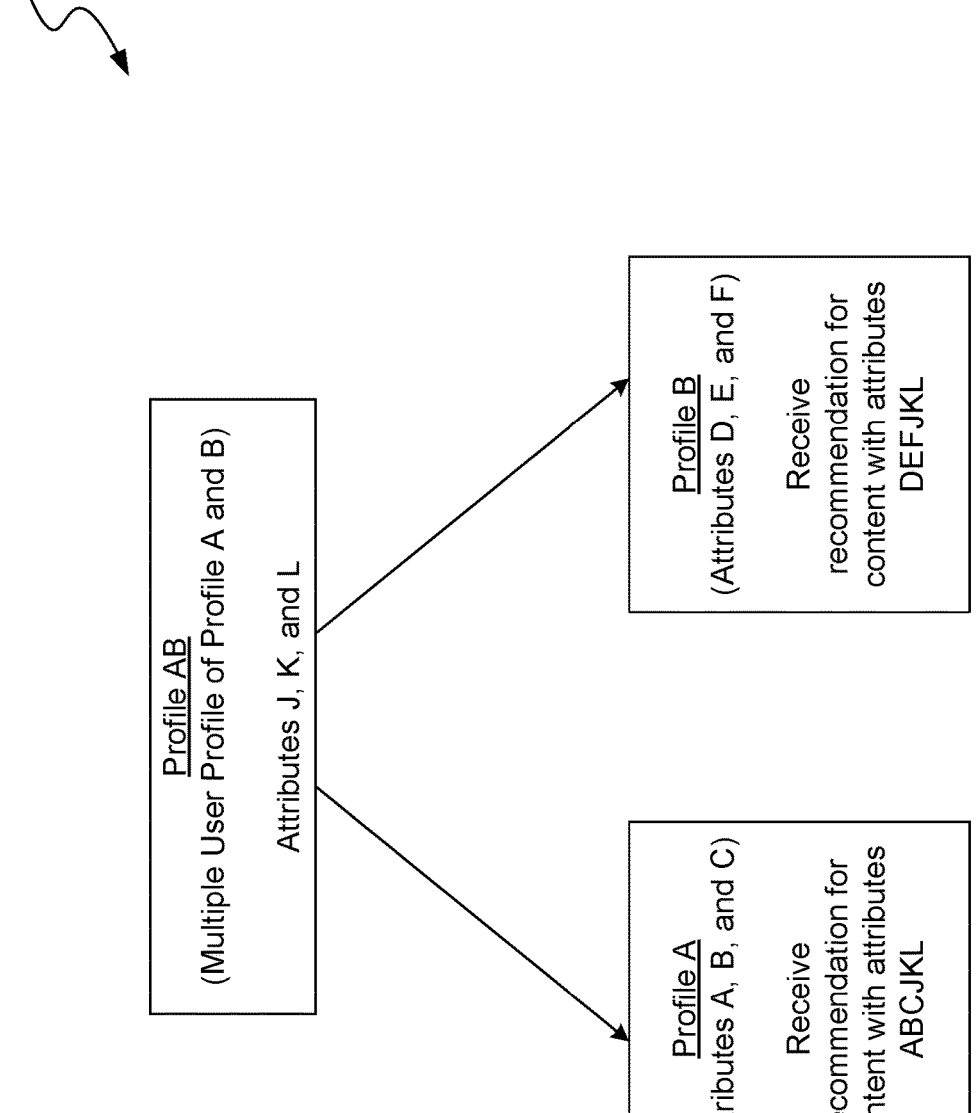
FIG. 4B illustrates a conceptual diagram of generating recommendations based on a multiple user profile.

FIG. 4B illustrates a conceptual diagram 420 of generating recommendations based on a multiple user profile. Profile AB (e.g., a multiple user profile based on Profile A and Profile B) includes media content attributes J, K, and L. Profile A includes media content attributes A, B, and C. Profile B includes media content attributes D, E, and F. The profile system can generate recommendations for individual Profiles A and B based on the media content attributes of profile AB. The profile system can recommend media content with attributes ABCJKL to Profile A and recommend media content with attributes DEFJKL to Profile B.

Figure 4C:
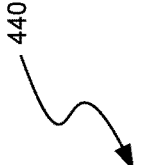
FIG. 4C illustrates a conceptual diagram of sending recommendations between user profiles.
Figure 4C:
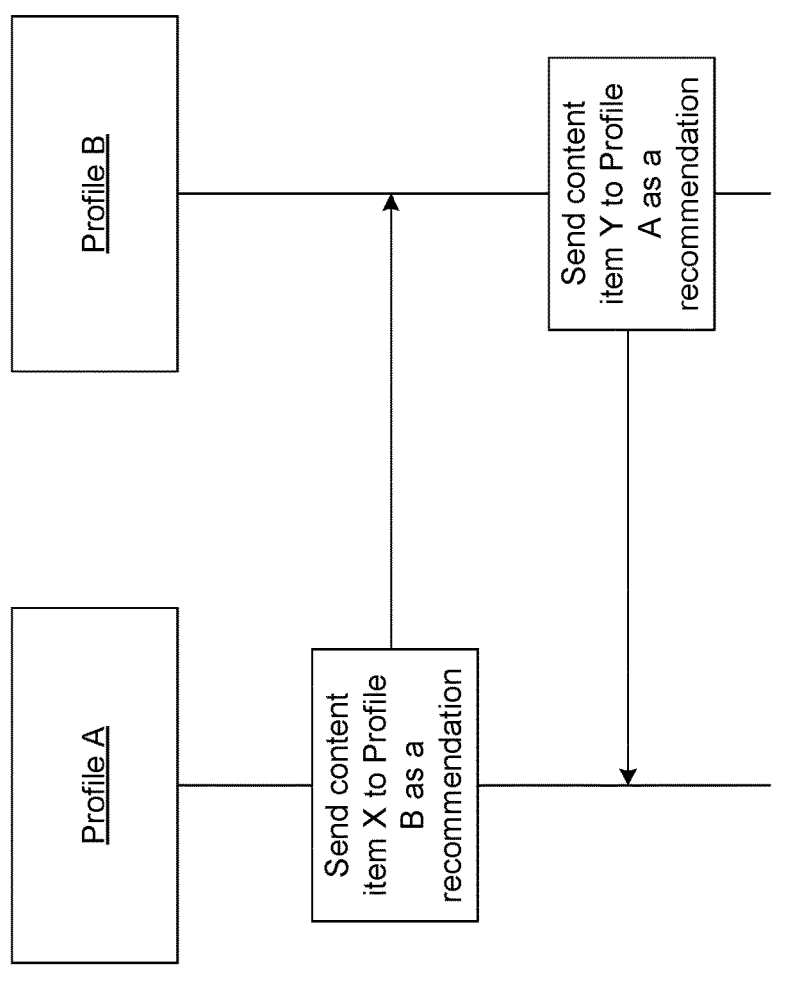

FIG. 4C illustrates a conceptual diagram 440 of generating recommendations between user profiles. A profile system or user associated with profile can generate and send media content recommendations to other profiles. The profile system or a user associated with profile A can send a recommendation to Profile B to watch content item X. For example, a first user can recommend that a second user watch a particular a movie that the second user will enjoy. The profile system or a user associated with profile B can send a recommendation to Profile A to watch content item Y.

Figure 4D:
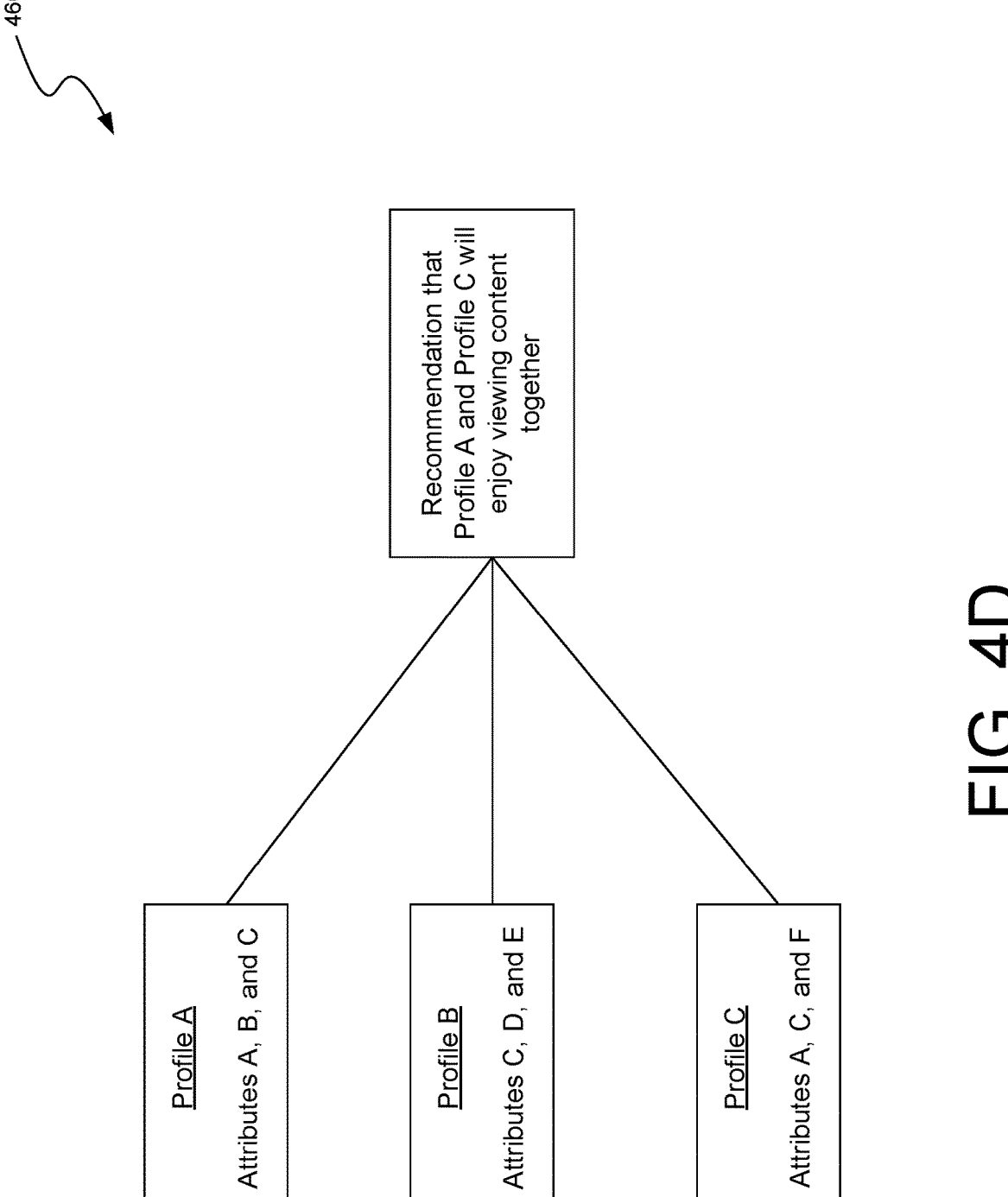
FIG. 4D illustrates a conceptual diagram of generating a recommendation for users to view content together.

FIG. 4D illustrates a conceptual diagram 460 of generating a recommendation for users to view content together. Profile A includes media content attributes A, B, and C. Profile B includes media content attributes D, E, and F. Profile C includes media content attributes A, C, and F. The profile system can generate a recommendation that Profile A and Profile C will enjoy viewing content together based on the shared attributes of A and C.

Figure 4E:
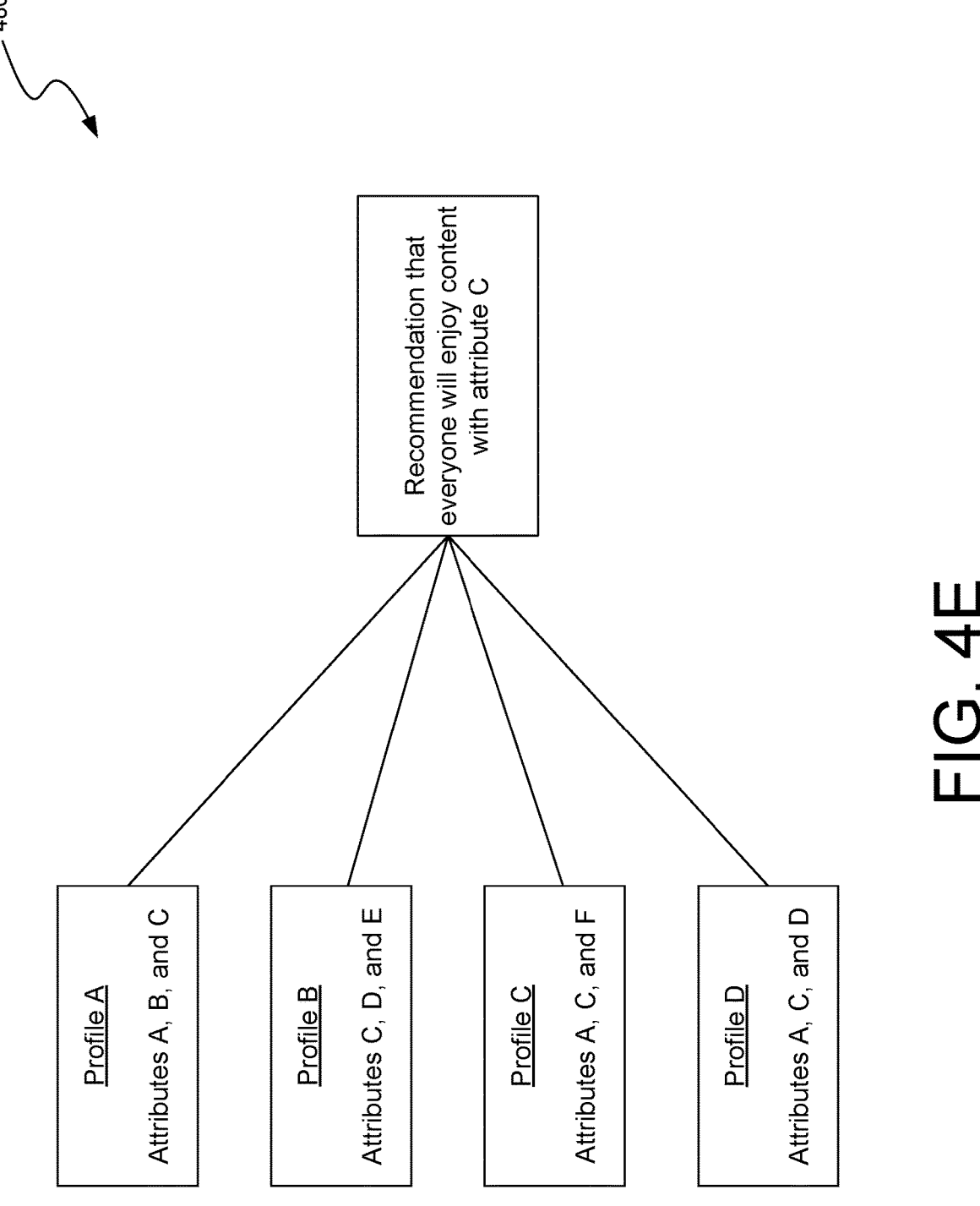
FIG. 4E illustrates a conceptual diagram of generating a content recommendation.

FIG. 4E illustrates a conceptual diagram 480 of generating a content recommendation. Profile A includes media content attributes A, B, and C. Profile B includes media content attributes C, D, and E. Profile C includes media content attributes A, C, and F. Profile D includes media content attributes A, C, and D. The profile system can generate a recommendation that all the users will enjoy media content with attribute C. For example, the profile system can identify a movie that all the members of a family will enjoy and can watch together.

Figure 5:
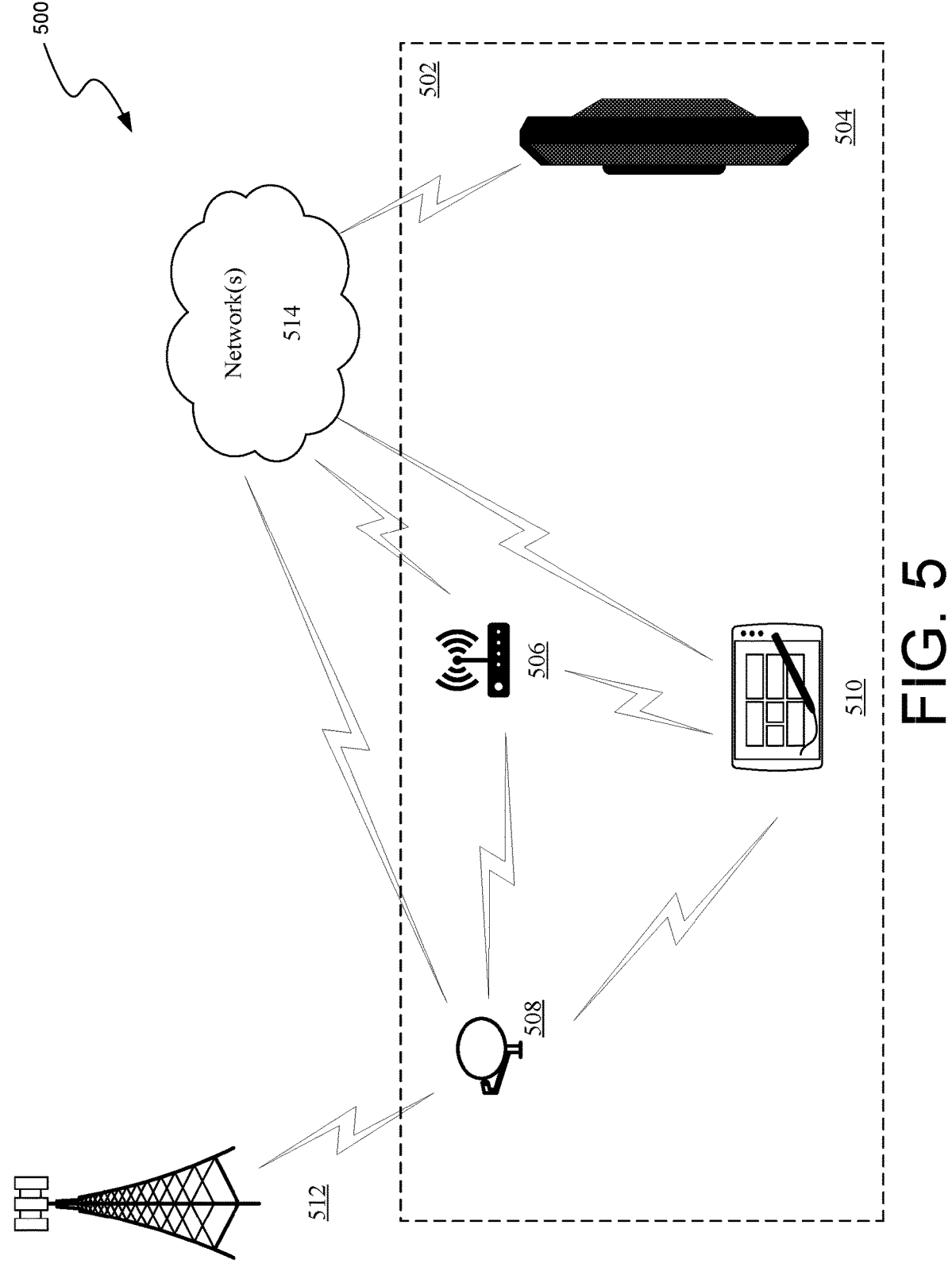
FIG. 5 illustrates an example environment of operation of the disclosed technology.

FIG. 5 illustrates an example environment 500 of operation of the disclosed technology. In the example environment illustrated in FIG. 5, area 502 may represent a house, a commercial building, an apartment, a condo, or any other type of suitable dwelling. Inside area 502 is at least one television 504, an OTA box 506 (e.g., router or broadcast module box) an OTA antenna 508, and a mobile device 510. Each of these devices may be configured to communicate with network(s) 514. OTA box 506 may be configured as a central gateway communicable with various multimedia content providers, networks, devices, and user storage sources, among other servers and databases housing content available for retrieval and display on user devices. Network(s) 514 may be a WiFi network and/or a cellular network. The OTA antenna 508 may also be configured to receive local broadcast signals from local broadcast tower 512 or satellite broadcast tower.

Figure 6:
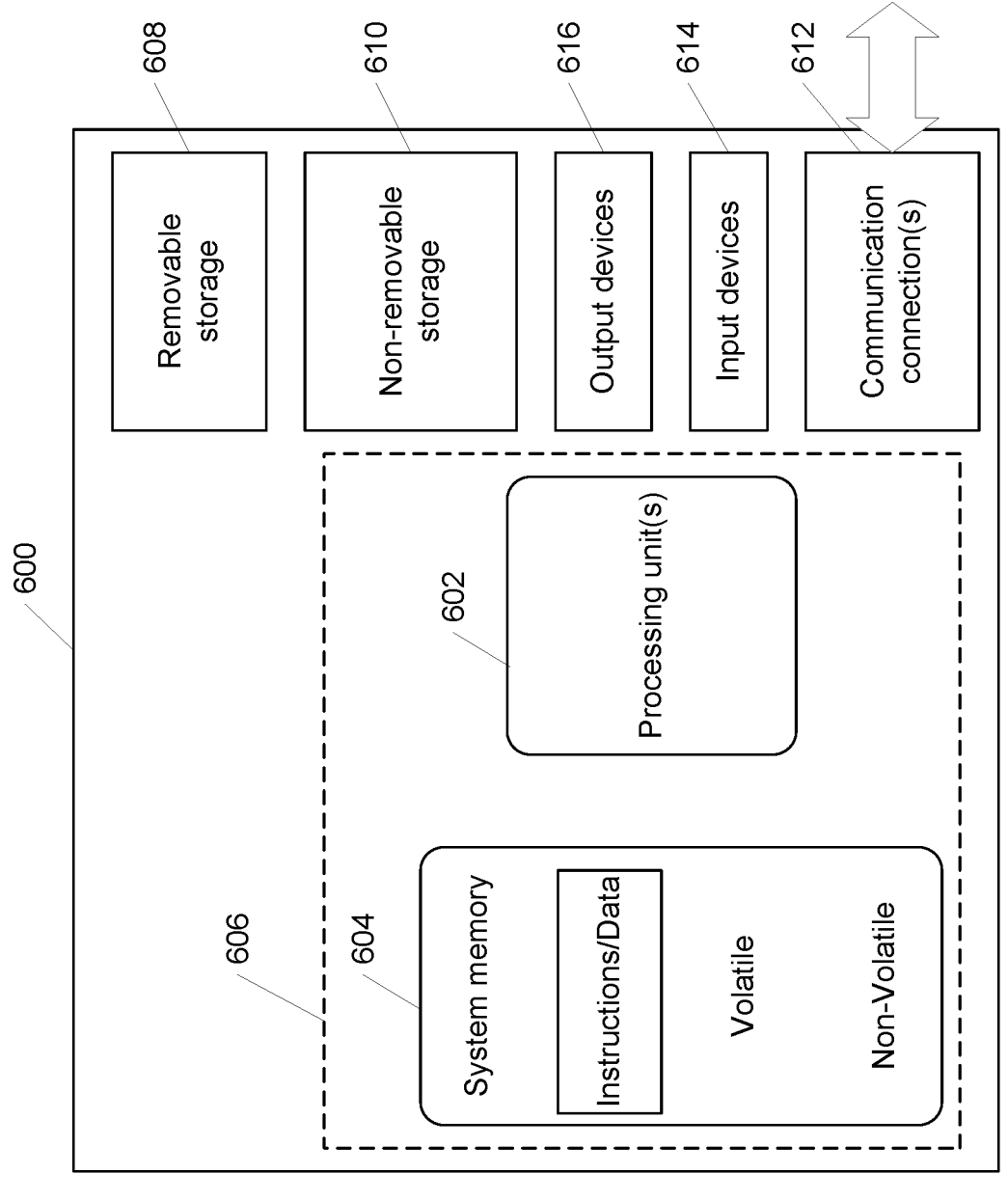
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, etc., and/or output device(s) 616 such as a display, speakers, printer, etc.

Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
  receiving, from a first user device associated with a first user, a request for a recommendation of a user to consume content together with the first user;
  determining a first set of attributes of media content consumed by the first user associated with a first user profile;
  determining a second set of attributes of media content consumed by a second user associated with a second user profile;
  assigning a first score to a type of media content consumed by the first user based on the first set of attributes;
  assigning a second score to the type of media content consumed by the second user based on the second set of attributes;
  in response to the first score being within a threshold difference of the second score,
    generating a multiple user profile for the first user and the second user to access media content together, wherein the multiple user profile includes the type of media content,
    identify at least one media content item that has at least one common attribute among the first user profile and the second user profile, and
    sending a notification to the first user device to recommend the first user consume content together with the second user,
      wherein the notification includes the at least one media content item.

2. The method of claim 1, further comprising:
  generating, based on at least one attribute of the multiple user profile, a recommendation of media content for the first user profile or the second user profile; and
  sending the recommendation to the first user profile or the second user profile.

3. The method of claim 1, further comprising:
  determining a third set of attributes of media content consumed by a third user associated with a third user profile;
  assigning a third score to the type of media content consumed by the third user based on the third set of attributes;
  in response to the first score being with the threshold difference of the third score, generating a recommendation for the first user to consume content with the third user; and
  sending, to the first user and the third user, the recommendation to consume content together.

4. The method of claim 1, further comprising:

sending, from the first user profile to the second user profile, a recommendation for the second user profile to consume a media content item.

5. The method of claim 1, further comprising:

receiving a request for a content item recommendation for three or more users to consume together;

analyzing three or more user profiles associated with the three or more users to identify at least one media content item that has at least one common attributed among the three or more user profiles; and sending, to at least one profile of the three or more user profiles, a recommendation of the at least one media content item.

6. The method of claim 1, wherein the first score is based on a duration the first user consumes the type of media content, a frequency that the first user consumes the type of media content, or feedback from the first user regarding the type of media content.

7. The method of claim 1, wherein the multiple user profile is generated by at least one machine-learning algorithm, wherein the at least one machine-learning algorithm is trained based on at least one dataset associated with previously generated multiple user profiles.

8. A non-transitory computer-readable medium storing instructions that, when executed by a computing system, cause the computing system to perform operations comprising:

receiving, from a first user device associated with a first user, a request for a recommendation of a user to consume content together with the first user;

determining a first set of attributes of media content consumed by the first user associated with a first user profile;

determining a second set of attributes of media content consumed by a second user associated with a second user profile;

assigning a first score to a type of media content consumed by the first user based on the first set of attributes;

assigning a second score to the type of media content consumed by the second user based on the second set of attributes;

in response to the first score being within a threshold difference of the second score, generating a multiple user profile for the first user and the second user to access media content together, wherein the multiple user profile includes the type of media content, identify at least one media content item that has at least one common attribute among the first user profile and the second user profile, and sending a notification to the first user device to recommend the first user consume content together with the second user, wherein the notification includes the at least one media content item.

9. The non-transitory computer-readable medium of claim 8, wherein the operations further comprise:

generating, based on at least one attribute of the multiple user profile, a recommendation of media content for the first user profile or the second user profile; and sending the recommendation to the first user profile or the second user profile.

10. The non-transitory computer-readable medium of claim 8, wherein the operations further comprise:

determining a third set of attributes of media content consumed by a third user associated with a third user profile;

assigning a third score to the type of media content consumed by the third user based on the third set of attributes;

in response to the first score being with the threshold difference of the third score, generating a recommendation for the first user to consume content with the third user; and sending, to the first user and the third user, the recommendation to consume content together.

11. The non-transitory computer-readable medium of claim 8, wherein the operations further comprise:

sending, from the first user profile to the second user profile, a recommendation for the second user profile to consume a media content item.

12. The non-transitory computer-readable medium of claim 8, wherein the operations further comprise:

receiving a request for a content item recommendation for three or more users to consume together;

analyzing three or more user profiles associated with the three or more users to identify at least one media content item that has at least one common attributed among the three or more user profiles; and sending, to at least one profile of the three or more user profiles, a recommendation of the at least one media content item.

13. The non-transitory computer-readable medium of claim 8, wherein the first score is based on a duration the first user consumes the type of media content, a frequency that the first user consumes the type of media content, or feedback from the first user regarding the type of media content.

14. The non-transitory computer-readable medium of claim 8, wherein the multiple user profile is generated by at least one machine-learning algorithm, wherein the at least one machine-learning algorithm is trained based on at least one dataset associated with previously generated multiple user profiles.

15. A system comprising:

one or more processors; and one or more memories storing instructions that, when executed by the one or more processors, cause the system to perform a process comprising:

receiving, from a first user device associated with a first user, a request for a recommendation of a user to consume content together with the first user;

determining a first set of attributes of media content consumed by the first user associated with a first user profile;

determining a second set of attributes of media content consumed by a second user associated with a second user profile;

assigning a first score to a type of media content consumed by the first user based on the first set of attributes;

assigning a second score to the type of media content consumed by the second user based on the second set of attributes;

in response to the first score being within a threshold difference of the second score, generating a multiple user profile for the first user and the second user to access media content together, wherein the multiple user profile includes the type of media content, identify at least one media content item that has at least one common attribute among the first user profile and the second user profile, and sending a notification to the first user device to recommend the first user consume content together with the second user, wherein the notification includes the at least one media content item.

16. The system according to claim 15, wherein the process further comprises:

generating, based on at least one attribute of the multiple user profile, a recommendation of media content for the first user profile or the second user profile; and sending the recommendation to the first user profile or the second user profile.

17. The system according to claim 15, wherein the process further comprises:

determining a third set of attributes of media content consumed by a third user associated with a third user profile;

assigning a third score to the type of media content consumed by the third user based on the third set of attributes;

in response to the first score being with the threshold difference of the third score, generating a recommendation for the first user to consume content with the third user; and sending, to the first user and the third user, the recommendation to consume content together.

18. The system according to claim 15, wherein the process further comprises:

sending, from the first user profile to the second user profile, a recommendation for the second user profile to consume a media content item.

19. The system according to claim 15, wherein the process further comprises:

receiving a request for a content item recommendation for three or more users to consume together;

analyzing three or more user profiles associated with the three or more users to identify at least one media content item that has at least one common attributed among the three or more user profiles; and sending, to at least one profile of the three or more user profiles, a recommendation of the at least one media content item.

20. The system according to claim 15, wherein the multiple user profile is generated by at least one machine-learning algorithm, wherein the at least one machine-learning algorithm is trained based on at least one dataset associated with previously generated multiple user profiles.

* * * * *